United States Patent
Oto et al.

(10) Patent No.: US 6,879,436 B2
(45) Date of Patent: Apr. 12, 2005

(54) CONSTANT OUTPUT LIGHT ATTENUATOR AND CONSTANT OUTPUT LIGHT ATTENUATING METHOD

(75) Inventors: Masanori Oto, Kanagawa (JP); Yuuichi Morishita, Kanagawa (JP); Haruhito Noro, Kanagawa (JP)

(73) Assignee: Showa Electric Wire & Cable Co., Ltd., Kanagawa (JP)

(*) Notice: Subject to any disclaimer, the term of this patent is extended or adjusted under 35 U.S.C. 154(b) by 41 days.

(21) Appl. No.: 10/380,833
(22) PCT Filed: Sep. 18, 2001
(86) PCT No.: PCT/JP01/08084
§ 371 (c)(1),
(2), (4) Date: Mar. 19, 2003
(87) PCT Pub. No.: WO02/25367
PCT Pub. Date: Mar. 28, 2002

(65) Prior Publication Data
US 2004/0033045 A1 Feb. 19, 2004

(30) Foreign Application Priority Data
Sep. 21, 2000 (JP) .................................. 2000-287285

(51) Int. Cl.[7] ........................... H01S 3/00; G02B 26/02; G02B 6/00
(52) U.S. Cl. .................... 359/341.1; 359/227; 385/122; 385/140
(58) Field of Search ......................... 359/341.1, 341.5, 359/227, 232, 639–640, 738–740, 833–837, 642; 385/122, 140, 36, 33, 34

(56) References Cited
U.S. PATENT DOCUMENTS

| | | | |
|---|---|---|---|
| 4,776,677 A | 10/1988 | Park et al. | |
| 4,846,561 A | 7/1989 | Soileau, Jr. et al. | |
| 4,952,016 A | 8/1990 | Adams et al. | |
| 4,973,125 A | 11/1990 | Normandin | |
| 5,317,454 A | 5/1994 | Sharp et al. | |
| 5,348,688 A | 9/1994 | Sharp et al. | |
| 5,828,679 A | * 10/1998 | Fisher | 359/344 |
| 6,134,372 A | * 10/2000 | Ichikawa et al. | 385/140 |
| 6,442,324 B2 | * 8/2002 | Tei et al. | 385/33 |

FOREIGN PATENT DOCUMENTS

| | | |
|---|---|---|
| JP | 63-148242 | 6/1988 |
| WO | WO 99/17472 A1 | 4/1999 |

OTHER PUBLICATIONS

Couris et al., "Characterization of Nonlinear Optical Materials for Photonic Applications, Unconventional Optical Elements for Information Storage", *Processing and Communications*, (2000), pp. 143–154.

Hagan et al., "Self–protecting semiconductor optical limiters", *Optics Letters*, vol. 13, No. 4, Apr., 1988, pp. 315317.

Tran et al., "$TE_{01}$ waves in nonlinear optical fibers and their device implications", *Optice Communications*, vol. 106, (1994), pp. 278–287.

* cited by examiner

*Primary Examiner*—Georgia Epps
*Assistant Examiner*—Alicia M. Harrington
(74) *Attorney, Agent, or Firm*—Jeffrey S. Melcher; Manelli Denison & Selter, PLLC (57) ABSTRACT

In a light attenuator or its attenuating method, a nonlinear optical material and an aperture section are placed respectively on a same optical axis, between a receiving optical finder and a sending optical fiber. The nonlinear optical material receives and refracts an input light outputted from the receiving optical fiber. The aperture section has an aperture, receives the light having passed through the nonlinear optical material, and outputs constant output light to the sending optical fiber by only allowing only a part of the light to be outputted from the aperture.

20 Claims, 7 Drawing Sheets

CONSTANT OUTPUT LIGHT ATTENUATOR AND CONSTANT OUTPUT LIGHT ATTENUATING METHOD

BACKGROUND OF THE INVENTION

1. Field of the Invention

The present Invention relates to a light attenuator which can approximately obtain constant outputting light strength and its attenuating method.

2. Description of the Related Art

In the adjustment of light strength of optical communication network or optical equipment, light attenuator is applied. Specially, with the development of recent transmitting system of Dense Wavelength Division Multiplexing (DWDM), the request with respect to the light attenuator is rapidly increasing. In the concrete, the light attenuator is used in the field of a light strength adjusting unit or a light amplifier of the translator in optical communication network. Also, the light attenuator is used in a light strength adjusting unit of optical equipment relating to a variety of light sources, for example, a laser diode (LD) light source or the like. Further, the light attenuator is used in a unit being for protecting a light detector to detect a high strength light.

In the light attenuators used for adjusting light strength or the like, currently, a fixed type and a variable type optical attenuating units are known.

On the one hand, the fixed type optical attenuating unit is used for obtaining predetermined attenuating amount by using attenuating filter or optical fiber added a attenuating dopant. In response to the attenuating amount, these fixed type optical attenuating units are classified.

On the other hand, the variable type optical attenuating unit includes a mechanical form light attenuator and a non-mechanical form light attenuator.

In the variable type optical attenuating units of mechanical, there are a type using a method which transfer light in space and attenuates the light; a type using a method which inserts a moveable attenuating optical filter into a light path; a type which quivers slightly optical fibers whose optical axes are corresponding to each other so as to cause a deviation between optical axes; and so on.

Also, in the variable type optical attenuating unit of non-mechanical, there are a Faraday effect type; a wave guide path type; a polymer wave guide path type using thermal optics; a Mach-Zehnder Mach-Zender. wave guide path (waveguide) type; and so on.

However, in the above prior art, there is a following subject to be solved.

For example, In the case that a optical communication network work is performed in which light strength in transferring path is changed, It is necessary to use a light attenuator whose attenuating amount must conform to the desired that in the transferring path.

Thus, when using a fixed type optical attenuating unit, because the attenuating amount of the fixed type optical attenuating unit is definite, to obtaining desired attenuating amount in the transferring path, the light attenuator is often exchanged with the attenuating amount in the transferring path changes. Because of this, there is a problem that, with the light strength changes sharply, It is impossible to correspond quickly to the change.

As compared with this, though the variable type optical attenuating unit has not the above problem like the fixed type optical attenuating unit, because the current variable type optical attenuating unit must be controlled electrically, electrical power is consumed. Moreover, when generating heat in using, because a driver is necessary for a attenuating amount control, the driver is assembled into a control unit. Therefore, there is a problem that the unit is large-sized.

SUMMARY OF THE INVENTION

In view of the above, the present invention is, neither depend upon the inputted light strength nor need the electrical control, to supplies a light attenuator and a light attenuating method for obtaining constant outputted light strength.

The present invention with constant outputted light strength comprises:

a nonlinear optical material whose refractive index changes depending upon the light strength of input light; and an aperture section which receives the light outputted from the nonlinear optical material and allows only, in the received light, the light within a definite radius from a optical axis to pass through.

Therefore, in light attenuating method using the light attenuator of the present invention, it is possible to always obtain constant outputted light strength no depending upon the light strength of input light. The inventions relating to the light attenuator and light attenuating method can attain the objective by the following-described means.

(1) According to a first aspect of the present invention, there is provided a constant output light attenuator, comprising:

a nonlinear optical material whose refractive index changes depending upon the light strength of input light; and an aperture section which is placed at the optical axis of the nonlinear optical material, receives the light outputted from the nonlinear optical material, and allow only the light within a definite radius from the optical axis to pass through.

(2) In the light attenuator of the present invention, the nonlinear optical material may be selected from any one of a corpuscle dispersion glass, an optical ceramics and an organic macromolecule material.

(3) Also, the nonlinear optical material may have an incident surface and a radiant surface, the incident surface lies at right angle to the optical axis, and the radiant surface inclines toward the optical axis with a predetermined angle.

(4) Also, on the optical axis at incident side of the nonlinear optical material, a convex lens may be placed.

(5) Also, at the incident side of the nonlinear optical material, a slit section may be placed whose central part of the major axis is placed a location deviating from the optical axis.

(6) Also, at the incident side of the nonlinear optical material, a convex lens and a slit section may be placed. The convex lens is placed on the optical axis, and the slit section is placed a location by making the central part of the major axis to deviate from the optical axis.

(7) Also, the nonlinear optical material may be make up of an optical fiber whose core has nonlinear optical effect.

(8) In this case, the core may be make up of a corpuscle dispersion glass.

(9) Further, the core may be make up of a material that has a quadratic nonlinear refractive index depending upon wavelength.

(10) In this case, the core may be make up of a material whose quadratic nonlinear refractive index is positive.

(11) Also, the core may be make up of a material whose quadratic nonlinear refractive index is negative.

(12) According to a second aspect of the present invention, there is provided a constant output light attenuating method, comprising:

outputting a light from a nonlinear optical material whose refractive index changes depending upon the light strength of input light, by making the input light pass through the nonlinear optical material;

receiving the light outputted from the nonlinear optical material by using a aperture section which is placed at a optical axis of the nonlinear optical material;

attenuating the received light by allowing only the light within a definite radius from the optical axis to pass through, by the aperture section.

In the light attenuating method of the present invention, the nonlinear optical material may be make up of the one selected from any one of a corpuscle dispersion glass, an optical ceramics and a organic macromolecule material.

(13) Also, the nonlinear optical material may have an incident surface and a radiant surface, the incident surface lies at right angle to the optical axis, and the radiant surface inclines toward the optical axis with a predetermined angle.

(14) Also, at the optical axis of incident side of the nonlinear optical material, a convex lens may be placed. In this case, in this case, a light first pass through the convex lens, then serves as input light to pass through the nonlinear optical material.

(15) Also, at the incident side of the nonlinear optical material, a slit section having a slit may be placed whose central part of the major axis is placed a location deviating from the optical axis. In this case, a light first pass through the slit, then serves as input light to pass through the nonlinear optical material.

(16) Also, at the incident side of the nonlinear optical material, a convex lens and a slit section may be placed.

(17) The convex lens is placed on the optical axis, and the slit section is placed a location by making the central part of the major axis deviate from the optical axis. In this case, a light first pass through the convex lens and the slit, then serves as input light to pass through the nonlinear optical material.

(18) Also, the nonlinear optical material may be make up of an optical fiber whose core has nonlinear optical effect.

(19) In this case, the core may be make up of a corpuscle dispersion glass.

(20) Further, the core may be make up of a material that has a quadratic nonlinear refractive index depending upon wavelength.

(21) In this case, the core may be make up of a material whose quadratic nonlinear refractive index is positive.

(22) Also, the core may be make up of a material whose quadratic nonlinear refractive index is negative.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Best modes of carrying out the present invention will be described in further detail using various embodiments with references to the accompanying drawing.

Figure 1:
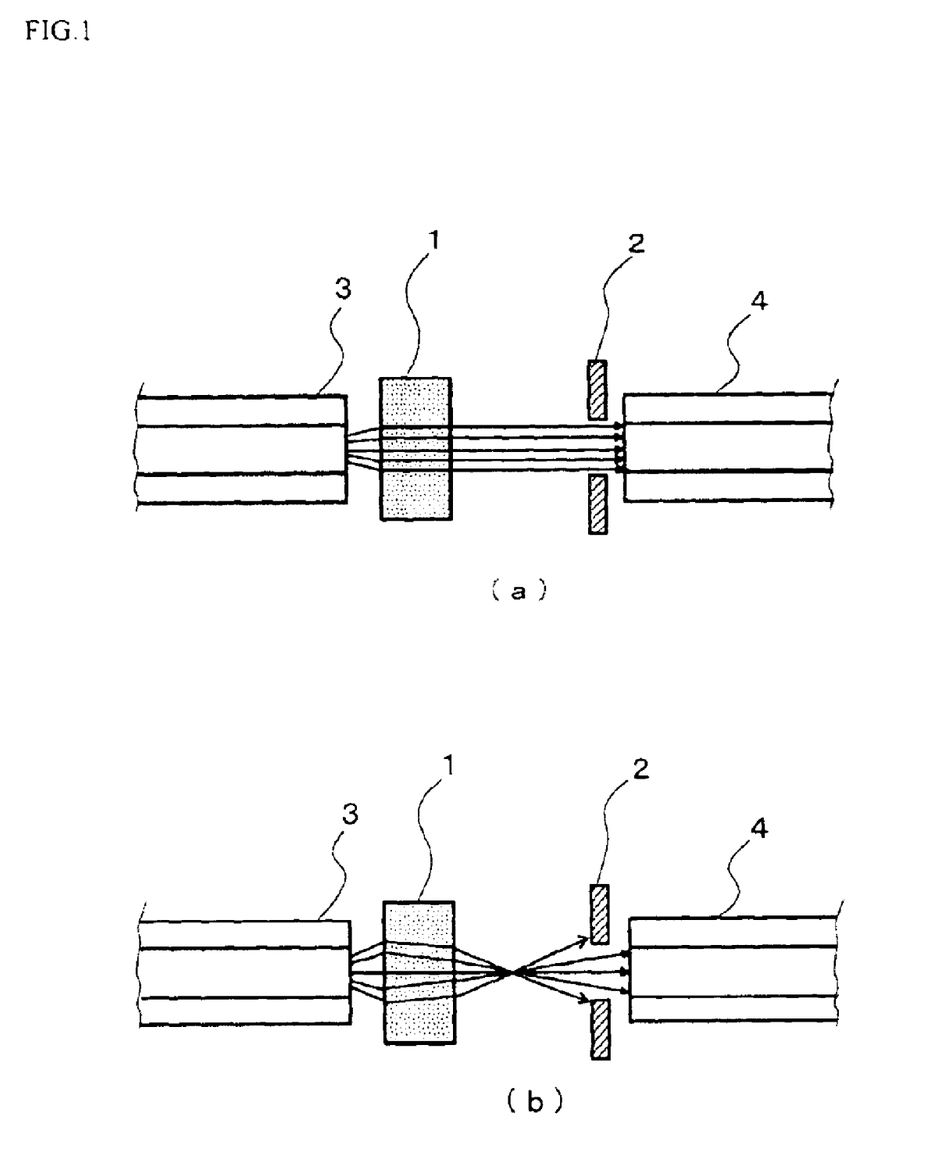
FIG. 1 is a longitudinal section showing the relation between a light attenuator of the present invention in one embodiment and the end portion of an optical fiber.

Embodiment 1:

FIG. 1 is a longitudinal section showing the relation between a light attenuator of the present invention in one embodiment and the end portion of an optical fiber.

The light attenuator of the present invention comprises a nonlinear optical material 1 and an aperture section 2 as shown by FIG. 1. The nonlinear optical material 1 and the aperture section 2 are placed respectively on an optical axis, together with a receiving optical fiber 3 used to receive a light and a sending optical fiber 4 used to send out a light. The light outputted from the receiving optical fiber 3, as input light, enters and passes through the nonlinear optical material 1. The light having passed through the nonlinear optical material 1 is spreading toward the radiant direction apart from the optical axis as a center. The aperture section 2 has an aperture, and with respect to the spreading light, the aperture only allows only the light within a definite radius of the optical axis to pass through. The light having passed through the aperture section 2 enters the sending optical fiber 4. In this case, by making a variety of parameter stated as follows conform mostly, the output light with constant strength can be obtained.

The object of the present invention, as stated above, is to supply a light attenuator and a light attenuating method that can always obtain approximate constant outputted light strength, rather than depending upon the strength of a input light. Now by combining the nonlinear optical material 1 and the aperture section 2, the object can be realized.

The nonlinear optical material 1 is a matter whose refractive index changes depending upon the light strength of input light. The refractive index is shown by the following expression:

$$n = n_0 + n_2 |E|^2 \quad (1)$$

Here in, the n0 is fixed refractive index that does not change depending upon light strength, n2 is quadratic nonlinear refractive index, E is light strength.

On the one hand, when the light strength of input light is weak, because it is possible to ignore the item "$n_2 |E|^2$" stated above, the refractive index of the nonlinear optical material 1 is constant approximately, as shown by FIG. 1(a). In the FIG. 1(a), the parallel light outputted from the receiving optical fiber 3, is passing through the nonlinear optical material 1 and entering the sending optical fiber 4 intact. Therefore, in this case, if ignoring the attenuate in the nonlinear optical material 1 of the parallel light, the parallel light outputted from the receiving optical fiber 3, enters the sending optical fiber 4, in almost no-attenuate state.

On the other hand, when the light strength of input light is strong, the influence of the item "$n_2 |E|^2$" becomes bigger. That is, because the refractive index of the nonlinear optical material 1 changes depending upon the light strength of input light, the input light entering the nonlinear optical material 1 is refracted then outputs when the input light becomes stronger, as shown by FIG. 1(b). In this case, the nonlinear optical material 1 performs a function of a convex lens. In the FIG. 1(b), the refracted light outputted from the nonlinear optical material 1 is passing through a focus between the nonlinear optical material 1 and the aperture section 2, and spreading toward the radiant direction apart from the focus as a starting point.

However, in the spreading light, the partial light on the outside is cut off by the aperture section 2. That is, the spreading light is attenuated by the aperture section 2. In other words, the aperture section 2 limited the spreading light. Thus, only the partial light within a definite radius from the optical axis as a center passes through the aperture section 2 and enters the sending optical fiber 4. Therefore, in this case that the light strength of the input light is bigger, Because the light outputted from the receiving optical fiber 3 is attenuated automatically by the aperture section 2, the light amount of the light entering the sending optical fiber 4 falls.

According to the above, the more strong the light strength of the input light is, the more big the light attenuating amount is. Further, the aperture section 2 stated above, has an aperture. The aperture is a circular opening that has a predetermined radius and is surrounding the optical axis as a center. When observing along the radius direction, the aperture makes the optical beam having regular thickness to pass through. Therefore, the partial light outside of the circular opening is cut off.

Moreover, regarding the nonlinear optical material 1 used in this embodiment, a corpuscle dispersion glass in which the corpuscle of such as copper or copper chloride or the like is dispersed; an optical ceramics of PLZT (a crystal formed by an oxide of Plumbum and Lanthan, and an oxide of Zirconium and Titan) or the like; or an organic macromolecule material of polydiacetylene or the like; etc. can be used.

Figure 2:
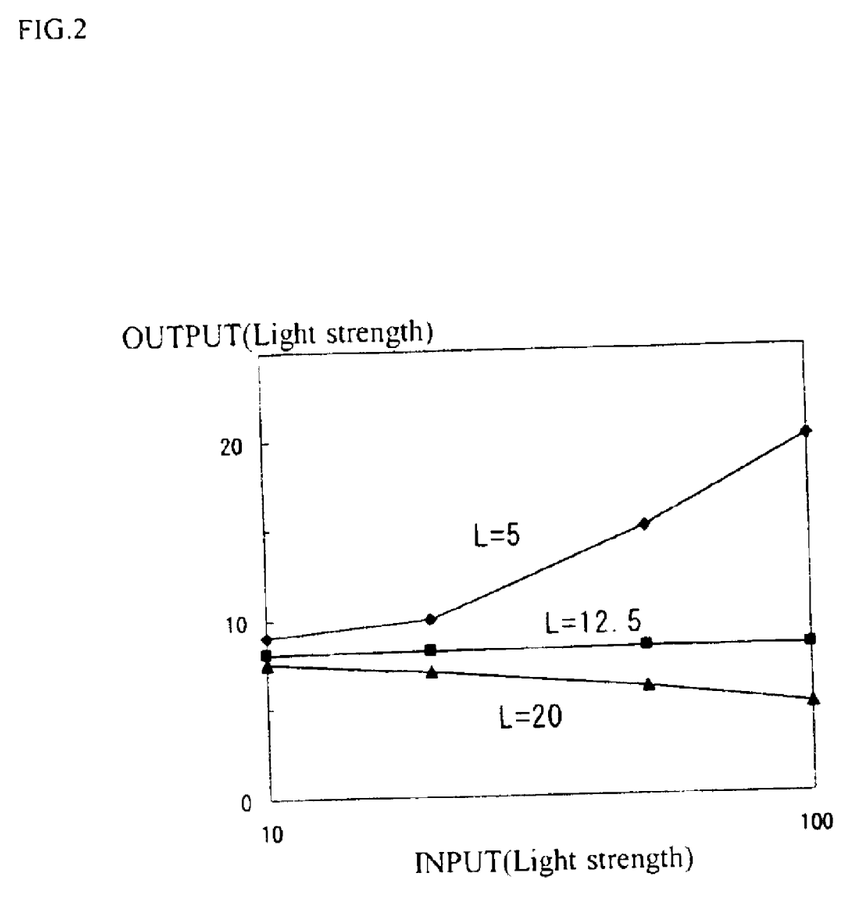
FIG. 2 is an explanation diagram showing the characteristic of a light attenuator of the present invention.

FIG. 2 is an explanation diagram showing the characteristic of a light attenuator of the present invention. In the FIG. 2, in correspondence with the various change of the distance L between nonlinear optical material 1 and aperture section 2, the relation between the light strength of input light and the light strength of output light is being shown. For example, such nonlinear optical material 1, whose refractive index $n_0=1.5$, quadratic nonlinear refractive index $n_2\_1.8*10^{-8}$ cm$^2$/watt, thickness t=20 mm, and such aperture section 2 having an aperture whose diameter Ø=10 μm, can be used. In this case, the space area filled with matching oil for keeping the optical consistency. Here, the used nonlinear optical material is make up of an Alkali-silicate glass with copper corpuscle dispersion.

In FIG. 2, it is shown that, when L=12.5 mm, the light strength of output light is constant approximately no depending upon the light strength of input light. Like this way, it is possible to obtain the light attenuator with constant outputted light strength, no depending upon the light strength of input light, by using a light attenuating method, which sets most appropriately these parameters of the quadratic nonlinear refractive index n2, the thickness t of the nonlinear optical material, the distance L between nonlinear optical material 1 and aperture section 2, and the diameter Ø of the aperture of the aperture section 2.

Figure 3:
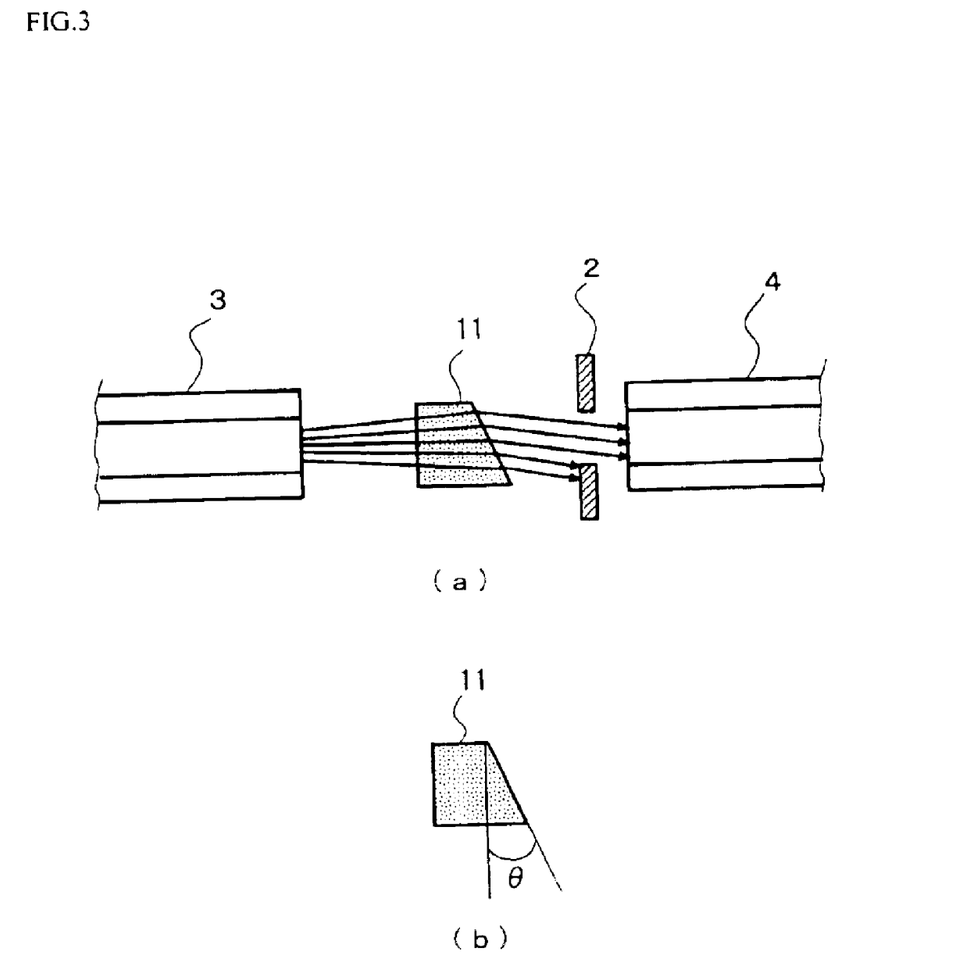
FIG. 3 is a longitudinal section showing the relation between a light attenuator of the present invention in other embodiment and the end portion of an optical fiber.

Embodiment 2:

FIG. 3 is a longitudinal section showing the relation between a light attenuator of the present invention in other embodiment and the end portion of an optical fiber.

In this embodiment, the nonlinear optical material 11 has an incident surface which receives the input light outputted from the receiving optical fiber 3, and a radiant surface which the light goes out of, as shown by FIG. 3. The incident surface lies at right angles to the optical axis. And the radiant surface inclines toward the optical axis, according to a predetermined angle (P) with respect to the vertical plane of the optical axis. The predetermined angle (P) is in the range of 0~90°. The light to be outputted from the inside of the nonlinear optical material 11 toward the aperture section 2, is refracted on the sloping radiant surface, according to the refractive index of the nonlinear optical material 11.

When the predetermined angle (P) is 0°, the optical beam outputted from the inside of the nonlinear optical material 11 to outside, are symmetric with respect to the optical axis as a symmetric axis.

Therefore, when the predetermined angle (P) is bigger than 0°, the optical beam outputted from the sloping radiant surface with the sloping angle (P) of the nonlinear optical material 11, are non-symmetric with respect to the optical axis as shown by FIG. 3(a).

With the above, the constant output light attenuator, which has a characteristic different from the embodiment 1 shown by FIG. 1, can be obtained.

Further, in the FIG. 3(a), the example that the light strength of input light is strong is being shown. However, when the light strength of input light is stronger than that in the example shown by FIG. 1(b), because the optical beam outputted from the inside of the nonlinear optical material 11 to the outside is strongly refracted, the percentage of the partial light cut off by the aperture section 2 becomes bigger. Therefore, for making the more partial light to certainly enter the aperture of the aperture section 2, it is necessary to set appropriately the sloping angle (P).

That is, in this embodiment, by setting most appropriately these parameters of the quadratic nonlinear refractive index n2; the thickness t of the nonlinear optical material; the angle (P) of the radiant surface of the nonlinear optical material 11; the distance L between nonlinear optical material 1 and aperture section 2; and the diameter Ø of the aperture of the aperture section 2, it is possible to obtain the light attenuator with constant outputted light strength, no depending upon the light strength of input light.

Figure 4:
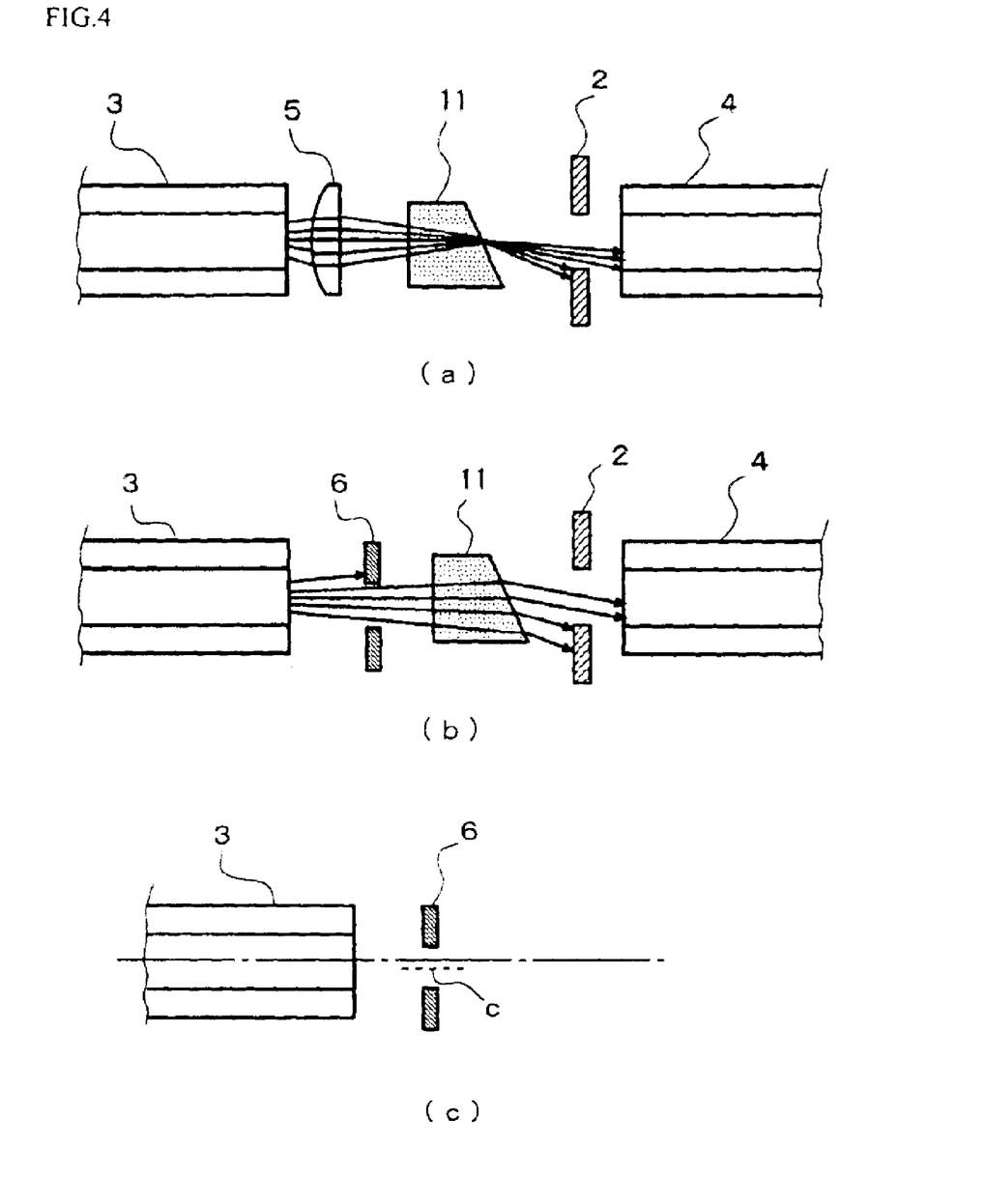
FIG. 4 is a longitudinal section showing the relation between a light attenuator of the present invention in more other embodiment and the end portion of an optical fiber.

Embodiment 3:

FIG. 4 is a longitudinal section showing the relation between a light attenuator of the present invention in more other embodiment and the end portion of an optical fiber.

In this embodiment shown by FIG. 4(a), the nonlinear optical material 11 as shown in FIG. 3 is used. Moreover, on the optical axis between the receiving optical fiber 3 and the nonlinear optical material 11, a convex lens 5 is placed. The refractive index and the thickness and others of the convex lens 5 are determined for making the optical beam to be gathered at the intersection point of the optical axis and the sloping radiant surface with a angle (P) of the nonlinear optical material 11. Thus, the input light toward the radiant surface of the nonlinear optical material 11 is focused. In this case, when the value of the item "$|E|^2$" becomes bigger, the attenuating amount of the input light also becomes big.

Next, to explain the FIG. 4(b), in which a slit section is placed.

The slit section 6 has a slit making light to pass through. The slit is showing a rectangle. The central part c (shown by a Dashed line in FIG. 4(c)) of the slit on the major axis is placed a location deviating from the optical axis shown by a DashDot line.

Thus, the strength distribution of the input light, after passing through the slit section 6, changes from normal distribution to non-symmetric distribution with respect to the optical axis, due to either a part of the input light at upper edge or a part of the input light at under edge is cut off. The input light with the non-symmetric distribution enters the nonlinear optical material 11 and is strongly refracted, then passes through the aperture section 2.

In this case, as shown in FIG. 4(b), in the upper part of the input light, the partial light at upper edge is cut off, so that the light of the upper part, after passes through the slit section 6, enters the aperture section 2. However, in the under part of the input light, because its partial light at under edge is not cut off, the light of the under part, after passes through the slit section 6, is cut off by the aperture section 2. Therefore, when the strength distribution indicates a non-symmetric state by the slit section 6, the remarkable effect of light attenuating can be obtained in comparison with other case no slit section.

In this embodiment, the combination of the nonlinear optical material 1, the convex lens 5 and the slit section 6 is not limited.

Figure 5:
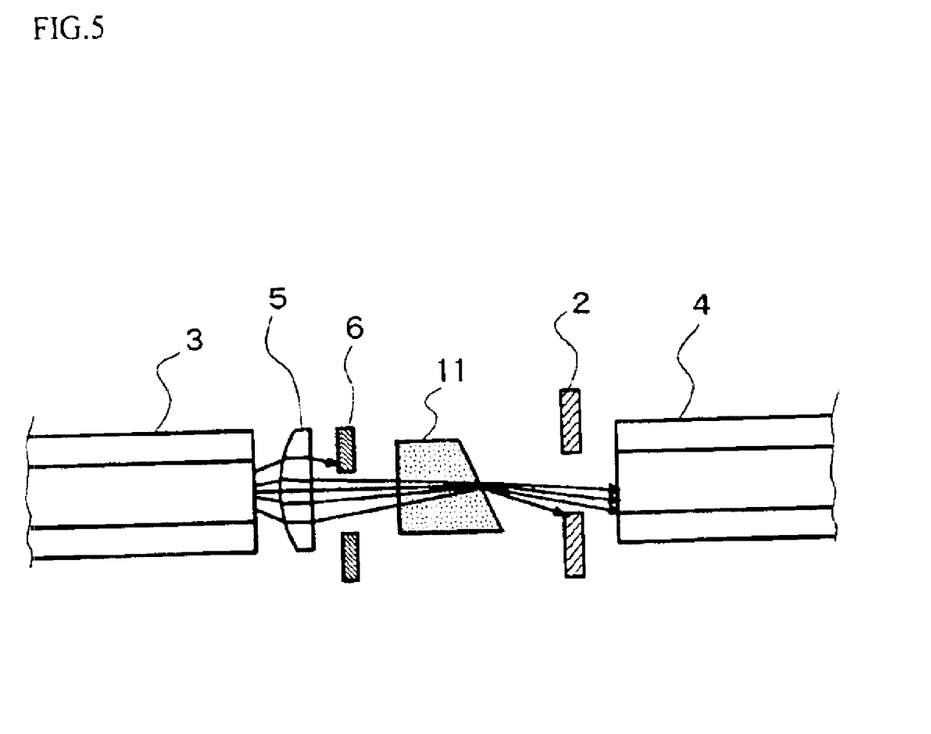
FIG. 5 is a longitudinal section showing the relation between a light attenuator of the present invention in more other embodiment and the end portion of an optical fiber.

Embodiment 4:

In FIG. 5, the embodiment is shown, in which, the nonlinear optical material 1, the convex lens 5 and the slit section 6 are combined and placed. However, the nonlinear optical material 11 may be formed like the shape in FIG. 1. The convex lens 5 and the slit section 6, respectively, may be individually placed. Also, the convex lens 5 and the slit section 6 may be combined like this embodiment. In a word, it is fine to select one combination of the nonlinear optical material 1, the convex lens 5 or the slit section 6, if only the combination is optimized.

Figure 6:
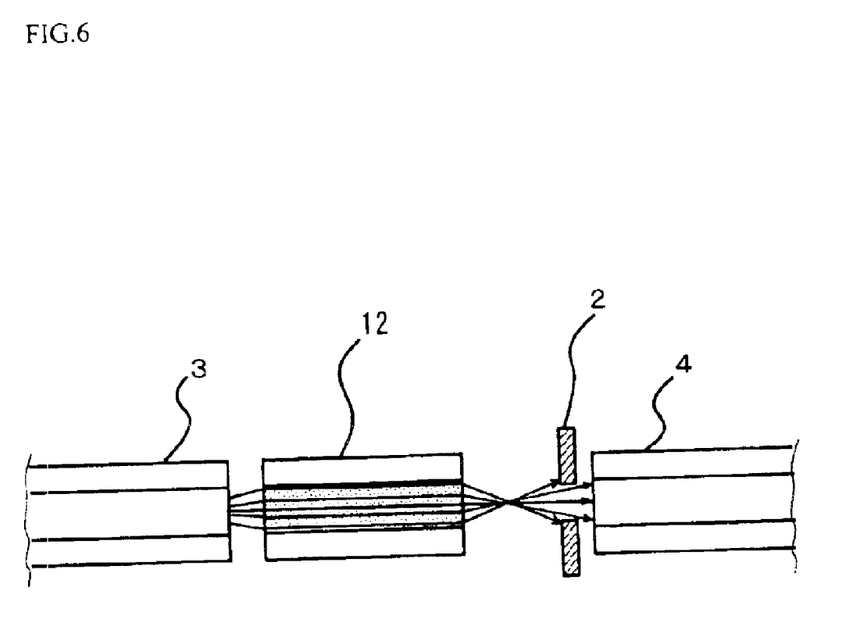
FIG. 6 is a longitudinal section showing the relation between a light attenuator of the present invention in more other embodiment and the end portion of an optical fiber.

Embodiment 5:

FIG. 6 shows an example, in which, an optical fiber is used as a nonlinear optical material.

In FIG. 6, the optical fiber 12 is made up of a glass of multi-component series. The core portion at center of the optical fiber 12 has higher refractive index. In the core portion, corpuscle (cluster) of such as copper or copper chloride or the like is dispersed. Therefore, the core portion is having. In this embodiment, the light outputted from receiving optical fiber 3 inputs the optical fiber 12 via the matching oil. Because the core portion of the optical fiber 12, as stated above, is made up of a corpuscle dispersion glass and has a nonlinear optical effect, the refractive index of the core portion changes depending upon the light strength of the input light.

The optical fiber 12 serving as nonlinear optical material used in this embodiment, has the quadratic nonlinear refractive index n2 in above expression (1). The n2 because has a dependence characteristic depending upon wavelength, becomes positive by any wavelength. Therefore, when the n2 is positive, in fact, the optical fiber 12 performs a function of convex lens. In this case, the light outputted from the optical fiber 12 is refracted and condensed at the focus on the optical axis of the optical fiber 12. Further, making the focus serve as starting point, the light spreads symmetrically with respect to the optical axis. Then a part of the spreading light passes through the aperture of the aperture section 2 placed at the same optical axis.

As stated above, the aperture section 2 allows only, in the spreading light, the partial light within the radius of the aperture, or more correctly, the partial light capable of going into the aperture, to pass through. Therefore, If only setting most appropriately the radius of the aperture of the aperture section 2 together with the above-described parameters, the light outputted from the aperture section 2, because does not depend upon the light strength of the input light inputting the aperture section 2, would become the wishful light with constant output strength, then enter the sending optical fiber 4.

Thus, when a light enters and passes through the nonlinear optical material, the light is attenuated by refraction at the incident surface and the radiant surface of the nonlinear optical material, or the like. Further, a wishful part of the attenuated light outputted from the nonlinear optical material goes into and passes through the aperture of the aperture section. Therefore, the light strength of the output light outputted from the aperture section 2 does not change even if the strength of the input light, that is, the attenuating light inputting the aperture section 2 changes. As a result, it is possible to obtain a light attenuator with constant output light.

In this embodiment, when optical fiber is used as nonlinear optical material, the length of the optical fiber may be selected more freely. Further, comparing the optical fiber with an element like Prism, the optical fiber can long get the nonlinear interaction length. Therefore, it is possible to substantially obtain the better nonlinear optical effect.

Regarding the nonlinear optical material shown in FIG. 1 or FIG. 3, it is necessary to polish its incident and radiant surfaces. However, when the nonlinear optical material is made up of an optical fiber, the polish processing is not necessary. In this case, there is advantage capable of simplifying the manufacture process of the nonlinear optical material.

Figure 7:
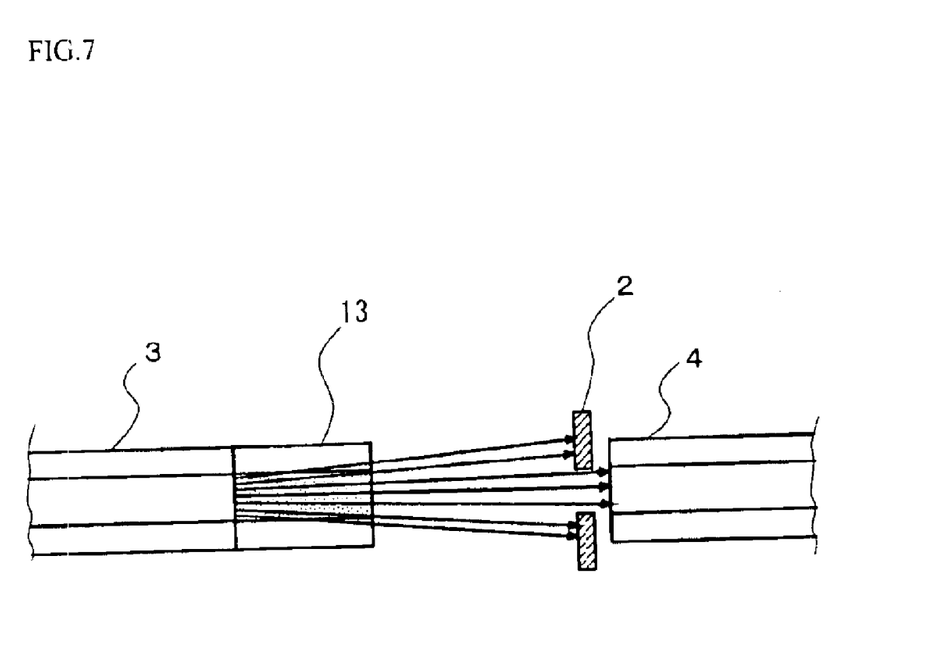
FIG. 7 is a longitudinal section showing the relation between a light attenuator of the present invention in more other embodiment and the end portion of an optical fiber.

Embodiment 6:

FIG. 7 is showing an example. In which, an optical fiber 13 having a core portion is used. And the core portion is formed by nonlinear optical material.

In this embodiment, the core portion of the optical fiber 13 is made up of a nonlinear optical material whose quadratic nonlinear refractive index n2 shown in the above expression (1), is negative with respect to any wavelength.

Regarding the optical fiber 13, because the core portion has a nonlinear optical characteristic and the negative refractive index n2, when light strength becomes stronger, the difference Δ of refractive index between the core portion and a clod portion would becomes smaller. Thus, because the light confined in the core portion trickles into the clod portion, the attenuating amount of a transmitting light becomes more.

Then, the one part of the light outputted from the optical fiber 13, is cut off by the aperture section 2 placed at the optical axis, and the other part of the light enters the aperture of the aperture section 2. Therefore, it is possible to obtain the output light with constant light strength.

What is claimed is:

1. A light attenuator which is used in optical communication network and outputs output light at a constant strength independent upon a light strength of input light comprising:
   a nonlinear optical material for receiving said input light having a refractive index that changes depending upon the light strength of said input light; and
   an aperture section disposed at an optical axis of said nonlinear optical material for receiving light outputted from said nonlinear optical material and allowing only light within a definite radius from said optical axis as a center to pass through, wherein said nonlinear optical material comprises any one of a corpuscle dispersion glass, an optical ceramics and an organic macromolecule material.

2. The constant output light attenuator according to claim 1, wherein said nonlinear optical material has an incident surface and a radiant surface, said incident surface lies at right angles to the optical axis, and said radiant surface inclines toward the optical axis with a predetermined angle.

3. The constant output light attenuator according to claim 1, further comprising a convex lens disposed at said optical axis on the incident side of said nonlinear optical material.

4. The constant output light attenuator according to claim 1, wherein said nonlinear optical material comprises an optical fiber having a core that has a nonlinear optical effect.

5. The constant output light attenuator according to claim 4, wherein said core comprises a material that has a quadratic nonlinear refractive index depending upon wavelength.

6. The constant output light attenuator according to claim 5, wherein said core comprises a material whose quadratic nonlinear refractive index is positive.

7. The constant output light attenuator according to claim 5, wherein said core comprises a material whose quadratic nonlinear refractive index is negative.

8. A light attenuator which is used in optical communication network and outputs output light at a constant strength independent upon a light strength of input light comprising:
a nonlinear optical material for receiving said input light having a refractive index that changes depending upon the light strength of said input light;
an aperture section disposed at an optical axis of said nonlinear optical material for receiving light outputted from said nonlinear optical material and allowing only light within a definite radius from said optical axis as a center to pass through; and
a slit section disposed on the incident side of said nonlinear optical material, said slit section is set such that a central part of a major axis is disposed at a position deviating from said optical axis.

9. A light attenuator which is used in optical communication network and outputs output light at a constant strength independent upon a light strength of input light comprising:
a nonlinear optical material for receiving said input light having a refractive index that changes depending upon the light strength of said input light;
an aperture section disposed at an optical axis of said nonlinear optical material for receiving light outputted from said nonlinear optical material and allowing only light within a definite radius from said optical axis as a center to pass through;
a convex lens disposed at said optical axis on the incident side of said nonlinear optical material; and
a slit section disposed between said nonlinear optical material and said convex lens, and the slit section having a central part of a major axis disposed at a position deviating from the optical axis.

10. A light attenuator which is used in optical communication network and outputs output light at a constant strength independent upon a light strength of input light comprising:
a nonlinear optical material for receiving said input light having a refractive index that changes depending upon the light strength of said input light; and
an aperture section disposed at an optical axis of said nonlinear optical material for receiving light outputted from said nonlinear optical material and allowing only light within a definite radius from said optical axis as a center to pass through, wherein said nonlinear optical material comprises an optical fiber having a core that has a nonlinear optical effect, and said core comprises a corpuscle dispersion glass.

11. A light attenuating method for obtaining output light having a constant strength independent upon a light strength of input light in an optical communication network comprising:
receiving said input light by using a nonlinear optical material having a refractive index that changes depending upon the light strength of said input light;
outputting a light from said nonlinear optical material by making said input light pass through said nonlinear optical material;
receiving light outputted from said nonlinear optical material using an aperture section that is disposed at an optical axis of said nonlinear optical material; and
attenuating the received light by allowing only light within a definite radius from said optical axis as a center to pass through said aperture section, wherein said nonlinear optical material comprises any one of a corpuscle dispersion glass, an optical ceramics and a organic macromolecule material.

12. The constant output light attenuating method according to claim 11, wherein said nonlinear optical material has an incident surface and a radiant surface, said incident surface lies at right angles to the optical axis, and said radiant surface inclines toward the optical axis with a predetermined angle.

13. The constant output light attenuating method according to claim 11, further comprising placing a convex lens at said optical axis on an incident side of said nonlinear optical material and obtaining said input light by making light pass through said convex lens and inputting to said nonlinear optical material.

14. The constant output light attenuating method according to claim 11, wherein said nonlinear optical material comprises an optical fiber having a core that has a nonlinear optical effect.

15. The constant output light attenuating method according to claim 14, wherein said core comprises a material that has a quadratic nonlinear refractive index depending upon wavelength.

16. The constant output light attenuating method according to claim 15, wherein said core comprises a material whose quadratic nonlinear refractive index is positive.

17. The constant output light attenuating method according to claim 15, wherein said core comprises a material whose quadratic nonlinear refractive index is negative.

18. A light attenuating method for obtaining output light having a constant strength independent upon a light strength of input light in an optical communication network comprising:
receiving said input light by using a nonlinear optical material having a refractive index that changes depending upon the light strength of said input light;
outputting a light from said nonlinear optical material by making said input light pass through said nonlinear optical material;
receiving light outputted from said nonlinear optical material using an aperture section that is disposed at an optical axis of said nonlinear optical material;
attenuating the received light by allowing only light within a definite radius from said optical axis as a center to pass through said aperture section; and setting a slit section on an incident side of said nonlinear optical material such that a central part of a major axis is disposed at a position deviating from the optical axis and obtaining said input light by making light pass through said slit section and inputting to said nonlinear optical material.

19. A light attenuating method for obtaining output light having a constant strength independent upon a light strength of input light in an optical communication network comprising:

- receiving said input light by using a nonlinear optical material having a refractive index that changes depending upon the light strength of said input light;
- outputting a light from said nonlinear optical material by making said input light pass through said nonlinear optical material;
- receiving light outputted from said nonlinear optical material using an aperture section that is disposed at an optical axis of said nonlinear optical material;
- attenuating the received light by allowing only light within a definite radius from said optical axis as a center to pass through said aperture section;
- placing a convex lens at said optical axis on the incident side of said nonlinear optical material; and
- placing a slit section between said nonlinear optical material and said convex lens such that a central part of a major axis is disposed at a position deviating from the optical axis, such that light passes through said convex lens and said slit section before being input to said nonlinear optical material.

20. A light attenuating method for obtaining output light having a constant strength independent upon a light strength of input light in an optical communication network comprising:

- receiving said input light by using a nonlinear optical material having a refractive index that changes depending upon the light strength of said input light;
- outputting a light from said nonlinear optical material by making said input light pass through said nonlinear optical material;
- receiving light outputted from said nonlinear optical material using an aperture section that is disposed at an optical axis of said nonlinear optical material; and
- attenuating the received light by allowing only light within a definite radius from said optical axis as a center to pass through said aperture, wherein said nonlinear optical material comprises an optical fiber having a core that has nonlinear optical effect and said core comprises a corpuscle dispersion glass.

* * * * *